United States Patent
Shi et al.

(10) Patent No.: US 12,071,382 B2
(45) Date of Patent: Aug. 27, 2024

(54) POST DEPOSITION HEAT TREATMENT PROCEDURES FOR EBC AND ABRADABLE COATING ON CERAMIC OR CMC SUBSTRATE

(71) Applicant: Rolls-Royce Corporation, Indianapolis, IN (US)

(72) Inventors: Jun Shi, Carmel, IN (US); Li Li, Carmel, IN (US); Gregory John Kenneth Harrington, Indianapolis, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 687 days.

(21) Appl. No.: 16/726,553

(22) Filed: Dec. 24, 2019

(65) Prior Publication Data
US 2021/0276925 A1  Sep. 9, 2021

(51) Int. Cl.
| | | |
|---|---|---|
| C04B 41/00 | (2006.01) |
| C04B 41/50 | (2006.01) |
| C04B 41/89 | (2006.01) |
| C23C 4/18 | (2006.01) |
| F01D 5/28 | (2006.01) |

(52) U.S. Cl.
CPC ........ C04B 41/009 (2013.01); C04B 41/0072 (2013.01); C04B 41/5024 (2013.01); C04B 41/89 (2013.01); C23C 4/18 (2013.01); F01D 5/282 (2013.01); F01D 5/288 (2013.01); *F05D 2230/31* (2013.01); *F05D 2230/40* (2013.01); *F05D 2230/90* (2013.01); *F05D 2300/15* (2013.01); *F05D 2300/6033* (2013.01); *F05D 2300/611* (2013.01)

(58) Field of Classification Search
CPC ...................................... C23C 4/18
See application file for complete search history.

(56) References Cited

U.S. PATENT DOCUMENTS

| | | | |
|---|---|---|---|
| 4,127,416 A | 11/1978 | Lumby et al. |
| 4,474,614 A | 10/1984 | Arentzen |
| 5,362,341 A | 11/1994 | Palmer et al. |
| 5,391,404 A | 2/1995 | Lee et al. |
| 5,496,644 A | 3/1996 | Lee et al. |
| 5,869,146 A | 2/1999 | McCluskey et al. |
| 6,254,935 B1 | 7/2001 | Eaton et al. |
| 6,284,325 B1 | 9/2001 | Eaton, Jr. et al. |
| 6,299,988 B1 | 10/2001 | Wang et al. |
| 6,787,195 B2 | 9/2004 | Wang et al. |
| 7,595,114 B2 | 9/2009 | Meschter et al. |
| 8,356,482 B2 | 1/2013 | Duval et al. |
| 9,347,302 B2 | 5/2016 | Kaminksy |
| 9,527,109 B2 | 12/2016 | Margolies et al. |
| 2004/0151840 A1 | 8/2004 | Wang et al. |
| 2005/0013993 A1 | 1/2005 | Li et al. |
| 2005/0238888 A1 | 10/2005 | Spitsberg et al. |
| 2011/0027578 A1 | 2/2011 | Kirby et al. |
| 2011/0033630 A1 | 2/2011 | Naik et al. |
| 2014/0363684 A1 | 12/2014 | Margolies et al. |
| 2016/0003063 A1 | 1/2016 | Rosenzweig et al. |
| 2016/0305004 A1 | 10/2016 | Olson et al. |
| 2016/0312628 A1* | 10/2016 | Kirby ................ C04B 35/62222 |
| 2018/0347049 A1* | 12/2018 | Oboodi .................. C23C 18/125 |
| 2019/0032504 A1 | 1/2019 | Shi et al. |
| 2020/0148544 A1 | 5/2020 | Sato et al. |
| 2021/0276925 A1 | 9/2021 | Shi et al. |

FOREIGN PATENT DOCUMENTS

| | | |
|---|---|---|
| EP | 1626039 A2 | 2/2006 |
| EP | 3178799 A1 | 6/2017 |
| EP | 3434803 A1 | 1/2019 |
| EP | 3702344 A1 | 9/2020 |
| WO | 2015126476 A2 | 8/2015 |
| WO | 2018186308 A1 | 10/2018 |

OTHER PUBLICATIONS

German, Thermodynamics of sintering, Sintering of Advanced Materials, Woodhead Publishing Series in Metals and Surface Engineering, 2010, pt. 3-32 (Year: 2010).*
Extended Search Report from counterpart European Application No. 120216039.6, dated May 3, 2021, 7 pp.
Reed, "Solid-State Sintering," Principles of Ceramics Processing 2nd ed, 1995 (Applicant points out, in accordance with MPEP 609.04(a), that the year of publication, 1995, is sufficiently earlier than the effective U.S. filing date, so that the particular month of publication is not in issue.), pp. 594-605.
Office Action from U.S. Appl. No. 16/884,841, dated Sep. 20, 2021, 15 pp.
U.S. Appl. No. 62/853,541, by Li Li et al., filed May 28, 2019.
Schneidman et al., The Fast Cooling/Heating Rate Effects in Devitrification of Glasses. II. Crystallization Kinetics, The Journal of Chemical Physics, vol. 109, No. 1, Jul. 1, 1998, pp. 186-195.
Sujidkul et al., "Correlating Electrical Resistance Change with Mechanical Damage in Woven SiC/SiC Composites: Experiment and Modeling," Journal of the American Ceramic Society, vol. 97, No. 9, Sep. 2014, pp. 2936-2942.

(Continued)

*Primary Examiner* — Tabatha L Penny
(74) *Attorney, Agent, or Firm* — Shumaker & Sieffert, P.A.

(57) ABSTRACT

In one example, a method for forming a coating system including an environmental barrier coating (EBC) and abradable coating on a substrate. The method may include depositing the EBC on a ceramic or ceramic matrix composite (CMC) substrate to form an as-deposited EBC; heat treating the as-deposited EBC following the deposition of the as-deposited EBC on the substrate to form a heat treated EBC; and subsequently depositing an abradable coating on the heat treated EBC to form an as-deposited abradable coating. The as-deposited abradable coating may be heat treated to form a heat treated abradable coating.

19 Claims, 4 Drawing Sheets

(56) References Cited

OTHER PUBLICATIONS

Uhlmann et al., "Nucleation, Crystallization and Glass Formation," Journal of Non-Crystalline Solids vol. 38 & 39, May-Jun. 1980, pp. 693-698.

Wada et al., "Mass Transfer in Polycrystalline Ytterbium Disilicate Under Oxygen Potential Gradients at High Temperatures," Acta Materialia, vol. 135, Jun. 2017, pp. 372-381.

Lee et al., "New Generation of Plasma-Sprayed Mullite Coatings on Silicon Carbide," Journal of the American Ceramic Society, vol. 78, No. 3, Apr. 1995, pp. 705-710.

Lee et al., "Refractory Oxide Coatings in SiC Ceramics," NASA Technical Memorandum 106677, Aug. 1994, 41 pp.

Richards et al., "Response of Ytterbium Disilicate-silicon Environmental Barrier Coatings to Thermal Cycling in Water Vapor," Acta Materialia, vol. 106, Jan. 8, 2016, 14 pp.

Garcia et al., "Phase and Microstructure Evolution in Plasma Sprayed Yb2Si2O7 Coatings," Journal of the European Ceramic Society, vol. 39, No. 4, Apr. 2019, pp. 1477-1486.

Response to Extended Search Report dated May 3, 2021, from counterpart European Application No. 20216039.6 filed Dec. 16, 2021, 59 pp.

Amendment in Response to Office Action mailed Sep. 20, 2021, from U.S. Appl. No. 16/884,841, filed Dec. 20, 2021, 8 pp.

Final Office Action from U.S. Appl. No. 16/884,841, dated Feb. 8, 2022, 12 pp.

Zhong et al., "Microstructure Evolution and Therinomechanical Properties of Plasma-Sprayed Yb2Si05 Coating During Thermal Aging," Journal of the American Ceramic Society, vol. 100, No. 5, May 2017, pp. 1896-1906.

Advisory Action from U.S. Appl. No. 16/884,841, dated Apr. 15, 2022, 3 pp.

Response to Final Office Action dated Feb. 8, 2022, from U.S. Appl. No. 16/884,841, filed Apr. 7, 2022, 9 pp.

Response to Final Office Action dated Feb. 8, 2022, and the Advisory Action dated Apr. 15, 2022, from U.S. Appl. No. 16/884,841, filed May 9, 2022, 10 pp.

Final Office Action from U.S. Appl. No. 16/884,841 dated Dec. 27, 2022, 13 pp.

Response to Office Action dated Aug. 1, 2022 from U.S. Appl. No. 16/884,841, filed Nov. 1, 2022, 9 pp.

* cited by examiner

FIG. 4

POST DEPOSITION HEAT TREATMENT PROCEDURES FOR EBC AND ABRADABLE COATING ON CERAMIC OR CMC SUBSTRATE

TECHNICAL FIELD

The disclosure relates to techniques for forming coatings on ceramic or ceramic matrix composite substrates.

BACKGROUND

Ceramic or ceramic matrix composite (CMC) materials may be useful in a variety of contexts where mechanical and thermal properties are important. For example, components of high temperature mechanical systems, such as gas turbine engines, may be made from ceramic or CMC materials. Ceramic or CMC materials may be resistant to high temperatures, but some ceramic or CMC materials may react with some elements and compounds present in the operating environment of high temperature mechanical systems, such as water vapor. Reaction with water vapor may result in the recession of the ceramic or CMC material. These reactions may damage the ceramic or CMC material and reduce mechanical properties of the ceramic or CMC material, which may reduce the useful lifetime of the component. Thus, in some examples, a ceramic or CMC material may be coated with an environmental barrier coating (EBC), which may reduce exposure of the substrate to elements and compounds present in the operating environment of high temperature mechanical systems. The ceramic or CMC material may also be coated with an abradable coating on the EBC, e.g., to provide a seal between an adjacent component such as a blade tip or rotating knife during operation of the high temperature mechanical system.

SUMMARY

In some examples, the disclosure relates to coating systems including abradable coatings and environmental barrier coatings (EBCs) on a substrate, e.g., for use in high-temperature mechanical systems, and techniques for forming the coating systems. In some examples, the technique may include depositing and heat treating the EBC on the substrate prior to deposition of the abradable coating on the heat treated EBC. In some examples, following deposition of the abradable coating, the abradable coating may also be heat treated. In cases in which the abradable coating is heat treated after depositing the abradable coating on the heat treated EBC, the conditions of the heat treatment of the EBC may be different than the conditions for the heat treatment of the abradable coating.

In some examples, the disclosure describes a method that comprises depositing an environmental barrier coating (EBC) on a ceramic or ceramic matrix composite (CMC) substrate to form an as-deposited EBC; heat treating the as-deposited EBC following the deposition of the as-deposited EBC on the substrate to form a heat treated EBC; and subsequently depositing an abradable coating on the heat treated EBC to form an as-deposited abradable coating.

In some examples, the disclosure describes a system a deposition device; a furnace; and a controller device configured to control the deposition device to deposit an environmental barrier coating (EBC) on a ceramic or ceramic matrix composite (CMC) substrate to form an as-deposited EBC, control the furnace to heat treat the as-deposited EBC following the deposition of the as-deposited EBC on the substrate to form a heat treated EBC, and control the deposition device to subsequently deposit an abradable coating on the heat treated EBC to form an as-deposited abradable coating.

The details of one or more examples are set forth in the accompanying drawings and the description below. Other features, objects, and advantages will be apparent from the description and drawings, and from the claims.

DETAILED DESCRIPTION

The disclosure describes systems and techniques for forming and heating treating a coating system including an abradable coating and an environmental barrier coating (EBC) on a ceramic or CMC substrate. The coating system may be deposited using, e.g., thermal spray deposition, such as air plasma spraying, slurry deposition, or other suitable technique. The coating system may be deposited on the substrate that serves as components of gas turbine engines or other high temperature mechanical systems.

A component of a high temperature mechanical system may include a coating system having both an EBC and an abradable coating on substrate, where the EBC is formed on the substrate and the abradable coating is formed on the EBC. The EBC may reduce exposure of an underlying substrate and/or bond layer to elements and compounds present in the operating environment of high temperature mechanical systems, such as water vapor or oxygen. The abradable coating may be configured to be abraded during the operation of a component in a high temperature mechanical system, e.g., to reduce clearance between a rotating component, such as a gas turbine blade, and a surrounding stationary component, such as blade track or blade shroud. For example, the abradable coating may be formed on a blade track or blade shroud and may be abraded as results of contact by the tip of a rotating turbine blade. As another example, the abradable coating may be formed on a runner of a knife seal and may be abraded as results of contact by the tip of a rotating knife of a knife seal. As the rotating component rotates, the tip of the rotating component contacts the abradable coating and wears away a portion of the abradable coating to form a groove in the abradable coating corresponding to the path of the rotating component tip. The intimate fit between the tip of the rotating component and abradable coating provides a seal that can reduce the clearance gap between the rotating component and an inner wall of the stationary component, which can reduce leakage around a tip of the rotating part to enhance the power and efficiency of the gas turbine engine.

In some examples, an EBC and abradable coating may be formed on a substrate by a thermal spray process. Due to the rapid quenching of sprayed EBC and abradable coatings, the as-sprayed EBC and abradable coatings may be primarily in an amorphous state. Following the thermal spray deposition of the EBC and abradable coatings, the combined coating system may undergo a heat treatment process to crystalize the coatings to achieve a consistent and more stable material state before entering into service.

In some examples, a single heat treatment step for the combined coating system (EBC plus abradable coating) following thermal spray deposition may present one or more issues. For example, a heat treatment with a relatively high heating rate may be desirable for the EBC to decrease the porosity of the heat treated EBC as compared to the as-deposited EBC. However, a heat treatment that decreases the porosity of the EBC may not be desirable for the abradable layer. Instead, a relatively slow heating rate may be desirable for an abradable coating, as the abradable coating may retain relatively high porosity and, thus, abradability. In other examples, it may be desirable to not heat treat the abradable coating following deposition of the coating. In some examples, if an abradable coating is heat treated at a slow heating/cooling rate such as about 10° C./min, the coating may retain a certain amount of porosity and abradability. However, if the coating is heat treated at a very high heating/cooling rate such as, e.g., about 100° C./min, for example by putting the coatings inside a preheated furnace, the coating densifies substantially and makes the abradable coating difficult to cut and more susceptible to unintended damage.

As another example, for water vapor attack, it may be desirable to have a dense EBC to slow down water vapor diffusion. For abradability, it is desirable to have a porous abradable coating to facilitate blade cut. Thus, to maintain the desired coating microstructures, the EBC and abradable coatings may therefore not be able to be heat treated together.

As described herein, an example process employed to form the coating system may include heat treating an as-deposited EBC prior to the deposition of the abradable coating on the EBC. The heat treatment of the EBC coating may be tailored to reduce the porosity of the as-deposited EBC, which may be desirable for an EBC but undesirable for an abradable coating formed on the EBC. In some examples, a relatively high heating rate and/or cooling rate (e.g., greater than 15° C./min or greater, such as about 100° C./min) may be employed for the EBC heat treatment, e.g., by placing the EBC and underlying substrate in a preheated furnace. The heat treatment of the EBC may convert an amorphous phase of the EBC to crystalline phase while reducing porosity of the as-deposited EBC.

The abradable coating may then be formed on the EBC following the heat treatment of the EBC rather than prior to the heat treatment of the EBC. In some examples, a separate heat treatment following deposition of the abradable coating on the heat treated EBC may be performed, which may be tailored to maintain or not significantly reduce the porosity of the heat treated abradable coating compared to the as-deposited abradable coating. In some examples, the abradable coating heat treatment may employ a relatively low heating rate (e.g., less than 15° C./min, such as, about 10° C./min) and/or a heating rate that is less than the heating rate of the EBC heat treatment. As noted above, if an abradable coating is heat treated at a slow heating/cooling rate such as about 10° C./min, the coating may retain a certain amount of porosity and abradability. In some examples, the porosity of the abradable coating may be increased by the heat treatment. In some examples, the heat treatment of the abradable coating may convert an amorphous phase of the abradable coating to crystalline phase while maintaining the porosity of the abradable coating, while the separate heat treatment of the EBC may convert an amorphous phase of the EBC to crystalline phase while maintaining the porosity of the EBC. In this manner, the porosity of the EBC coating may be reduced by a heat treatment without undesirably reducing the porosity of the abradable coating during the heat treatment of the EBC. Instead, separate heat treatments may be performed with the conditions of the first heat treatment being tailored for the as-deposited EBC and the conditions of the second heat treatment being tailored for the as-deposited abradable coating. In some examples, the heating rate, heat treatment temperature, duration, and/or cooling rate of the EBC heat treatment may be different than the heating rate, heat treatment temperature, duration, and/or cooling rate of the abradable coating heat treatment, e.g., to reduce the porosity of the as-deposited EBC while not reducing or reducing the porosity of the abradable coating to a lesser degree.

As described above, the heat treatment of the as-deposited EBC coating on a substrate, prior to the deposition of the abradable coating, may be configured to reduce the porosity of the as-deposited EBC and/or provide for one or more other changes to the as-deposited EBC (e.g., by using a relatively high heating rate). For example, the as-deposited EBC may undergo a heat treatment on the substrate to decrease the open porosity and/or microcracks of the heat treated EBC as compared to the as-deposited EBC porosity, control the crystalline phase grain size of the EBC, and/or control the microstructure of the EBC (e.g., control the size and distribution of secondary phases such as ytterbium monosilicate in the coating).

In some examples, the decrease in open porosity and/or microcracks of the heat-treated EBC may include a decrease in the percentage of open porosity and/or microcrack networks of the heat treated EBC compared to the as-deposited EBC (e.g., by filling or otherwise closing at least some of the interconnected pores and/or microcrack networks in the as-deposited EBC). The decrease in the open porosity and/or microcracks of the heat-treated EBC may decrease the viscous gas permeability of the heat treated EBC compared to the as-deposited EBC. In some examples, the heat treatment may increase the density of the heat treated EBC compared to the as-deposited EBC.

EBCs may be an important contributor to the success of ceramics or CMCs in a high temperature system. For example, the EBCs may be configured to protect against oxidation, water vapor recession, and other deleterious reactions damaging the structure of a ceramic or CMC, e.g., during operation of the high temperature system. In some examples, an EBC may contain a multilayered structure including a silicon bond layer and a rare-earth silicate (e.g., rare earth monosilicate and/or rare earth disilicate) layer. The layers of the EBC may be deposited, e.g., using a thermal spraying process, such as, air plasma spraying, which may produce an amorphous structure within the coating, e.g., due to the high cooling rates/quenching of the particles upon impact with a substrate. The resulting amorphous structure may change to a crystalline structure over time when subjected to higher temperatures, e.g., during operation of a high temperature system. An uncontrolled transition from amorphous to crystalline structure over time may also result in volumetric changes and, thus, internal stresses in the layer(s) (e.g., a rare-earth disilicate layer). In particular, in some examples, as the EBC structure changes from amorphous to crystalline, there may be shrinkage in the overall area. This may cause a build-up in stress in the EBC as well as the silicon bond coat. Eventually, the build-up in stress reaches a threshold and causes a crack to initiate and propagate to relieve the stress state.

In some examples, an EBC may undergo a post deposition heat treatment to convert the amorphous phase of the EBC to crystalline phase. Depending on the parameters of the heat treatment, the heat treated EBC may still exhibit relatively high porosity (e.g., open porosity) and/or microcracks. The relatively high porosity and/or microcracks may reduce the ability of the coating to protect the underlying CMC substrate from oxidation and volatilization, as well as CMAS infiltration. Furthermore, the number of grains and/or the relatively small size of the grains of the crystalline phase within the heat treated EBC may result in an undesired concentration of grain boundaries within the heat treated EBC. The grain boundaries may provide pathways for penetration of water vapor through the EBC, resulting in oxidation of the underlying CMC substrate.

As one example, a CMC plus EBC system may include a SiC/SiC CMC that is coated with a Si bond coat and a multilayered rare-earth silicate-based EBC. A thermally sprayed or otherwise deposited EBC may encompasses a certain level of open porosity and microcracks that act as open pathways for oxygen and water vapor to transport through the coating and oxidize the underlying bond coat and CMC. In addition, grain boundaries have been shown to be fast transport pathways for oxidants in rare-earth silicates. Reducing open porosity, healing microcracks and/or controlling grain size may be crucial to maximize the EBC's performance as a barrier to protect the SiC-based CMCs from oxidation.

The as-deposited EBC may contain a significant volume percentage of amorphous material and thus devitrification (crystallization) will occur at elevated temperatures. Various densification mechanisms of the EBC may apply depending upon the coatings amorphous content, chemistry and heat treatment procedure. As will be described further below, some heat treatment procedures may actually cause a coating to become more porous, e.g., as a result of a relatively low rate of temperature increase to the heat treatment temperature.

In accordance with examples of the disclosure, systems and techniques are described that include heat treating an EBC following deposition on a ceramic or CMC substrate but prior to the deposition of an abradable layer. The deposited EBC may include one or more EBC layers. The heat treatment of the as-deposited coating may be configured to at least one of decrease the porosity (e.g., open porosity and/or microcracks) of the heat treated EBC as compared to the as-deposited EBC, control, e.g., increase, the grain size of the crystalline phase of the heat treated EBC, and/or control the microstructure and distribution of the heat treated EBC (e.g., control the size and distribution of secondary phases such as ytterbium monosilicate in the coating).

In some examples, the heat treatment of the EBC may include heating the as-deposited EBC at a relatively high rate to the elevated heat treatment temperature (e.g., from room temperature). For example, the heat treatment may include raising the temperature of the as-deposited EBC at a rate of greater than 15 degrees Celsius (° C./min), such as about 100° C./min to about 300° C./min to the elevated heat treatment temperature. In some examples, the elevated heat treatment temperature may be set at about 500° ° C. to about 1500° C. The EBC may be maintained at the elevated heat treatment temperature for a selected period of time.

As will be described below, in some examples, the relatively high rate of temperature change to reach the elevated heat treatment temperature may allow the amorphous phase of the as-deposited coating to flow, e.g., to fill the pores and/or microcracks of the coating, before transitioning to crystalline phase. In some examples, the flow of the amorphous material may close at least some of the interconnected pores of the open porosity and/or close at least some of the microcrack networks present in the as-deposited EBC. In this manner, the porosity and/or microcracks of the EBC may be decreased, which may increase the hermeticity of the EBC for protection of the underlying substrate from water vapor and oxygen. In some examples, the density of the heat treated EBC may be increased compared to the as-deposited EBC.

Conversely, it has been found that is some cases, increasing a temperature at a relatively low rate (e.g., less than 15° C./min) for a heat treatment of a coating may cause the amorphous phase to transition to crystalline phase with substantially no flow such that the microstructure of the coating is effectively "locked in" without the amorphous material flowing into the pores and microcrack of the as-deposited material. In such an example, the porosity (e.g., open porosity and/or microcracks) of the as-deposited coating may not substantially decrease as a result of the heat treatment. In some examples, as described herein, such a heat treatment may be used following the deposition of an abradable coating on an already heat treated EBC. In this manner, the porosity of the as-deposited abradable coating may be maintained at a desirable level (e.g., to function as an abradable coating) while still transitioning at least some of the amorphous phase material of the as-deposited abradable coating to crystalline phase.

Although not wishing to be bound by theory, two possible mechanisms caused by the relatively high heating rate during heat treatment include: 1) the heating rate is fast enough that the amorphous component of the as-deposited coating may become viscoelastic and has sufficient time to flow before the onset of crystallization, thereby closing open porosity and/or healing (e.g., filling) cracks in the coating; and/or 2) the fast heating rate delays the onset of crystallization thereby allowing the coating sufficient time to become viscoelastic and flow. Such delayed onset of crystallization with be consistent with changing the crystallization kinetics of a glass by increasing the heating rate. In some examples, the two mechanisms may be densification mechanisms.

In some examples, the heat treatment of the as-depositing EBC may include heating the as-deposited coating to an elevated heat treatment temperature and maintaining the coating at (or above) that heat treatment temperature for a set period of time. In addition to, or as an alternative to decreasing the porosity and/or microcracks of the EBC, the parameters of the heat treatment (e.g., the heat treatment temperature, the rate of temperature increase to reach the heat treatment temperature, and/or the duration of period of time) may be selected to control the grain size of the crystalline phase of the resulting heat treated EBC. For example, in some instances, the heat treatment temperature, rate of temperature increase, and/or duration may be selected to nucleate a relatively low number of grains during crystallization of the amorphous as-deposited EBC, and then growing those grains during the heat treatment. Compared to a heat treatment that nucleates more grains, resulting heat treated EBC may have a lower amount of grain boundaries within the heat treated layers, thereby decreasing the transport pathways for oxidants within the heat treated coating.

Following the EBC heat treatment, an abradable coating may be deposited on the heat treated EBC and then another heat treatment may be performed. In some examples, the heat treatment of the as-depositing abradable coating may include heating the as-deposited coating to an elevated heat treatment temperature and maintaining the coating at (or above) that heat treatment temperature for a set period of time. The parameters of the heat treatment (e.g., the heat treatment temperature, the rate of temperature increase to reach the heat treatment temperature, and/or the duration of period of time) may be selected to maintain the porous structure of the as-deposited abradable coating. For example, in some instances, the heat treatment temperature, rate of temperature increase, and/or duration may be selected to such that the porosity of the heat treated abradable coating is substantially the same as the as-deposited coating or not significantly reduced compared to the as-deposited coating. In some examples, the heat treatment of the abradable coating may maintain the porosity of the abradable coating above a threshold level. In some examples, the heat treatment of the abradable coating may reduce the porosity of the as-deposited abradable coating a lesser percentage than the percentage of porosity decrease caused by the heat treatment of the as-deposited EBC.

In some examples, the disclosure relates to techniques for densifying or otherwise modifying a plasma sprayed EBC so that the coating will have reduced porosity and microcracks. An EBC will have a lower gas permeability which will enhance the coatings performance as a barrier to protect SiC-based CMC from oxidation and volatilization. The SiC-based CMC component coated with an abradable coating, EBC and an optional bond coat that are deposited by a plasma spray or slurry based processing techniques. The abradable coating and EBC may include a rare-earth (RE) monosilicate, RE disilicate or a mixture thereof, and the bond coat may include silicon, a metal silicide, RE monosilicate, RE disilicate, hafnium silicate, mullite, SiC, a metal oxide or a mixture thereof.

Examples of the disclosure may include one or more post coating deposition heat treatment(s) in air, oxygen, water vapor, inert gas, vacuum or combinations thereof, e.g., for the heat treatment of the EBC only or the heat treatment of the EBC followed by another heat treatment of the abradable coating. The heat treatment of the as-deposited EBC may be implemented at a relatively fast heating rate, e.g. greater than 15° C./min, such as, about 100° C./min to about 300° C./min, or about 100° C./min. The heat treatment temperature can be set at, e.g., about 500° C. to about 1500° C., with a total time duration of about 0.1 to about 100 hours. In some examples, a single heat treatment for the EBC may be comprised of several segments where one segment is aimed to densify or decreasing the porosity and/or microcracks of the coating while another segment is aimed to control the grain size of the coating. Each segment may have a unique temperature and time.

Conversely, the heat treatment of the abradable coating that is being deposited on the heat treated EBC may be implemented at a relatively low heating rate, e.g. less than 15° C./min, such as, about 5° C./min to less than 15° C./min, about 5° C./min to about 12° C./min or at about 10° C./min. In some examples, the relatively low heating rate may be about 10° C./min to about 30 minutes/° C. The heat treatment temperature can be set at, e.g., about 500° C. to about 1500° C., with a total time duration of about 0.1 to about 100 hours. As described herein, in some examples, the abradable coating may not undergo a heat treatment following the deposition of the abradable coating on the heat treated EBC.

Figure 1:
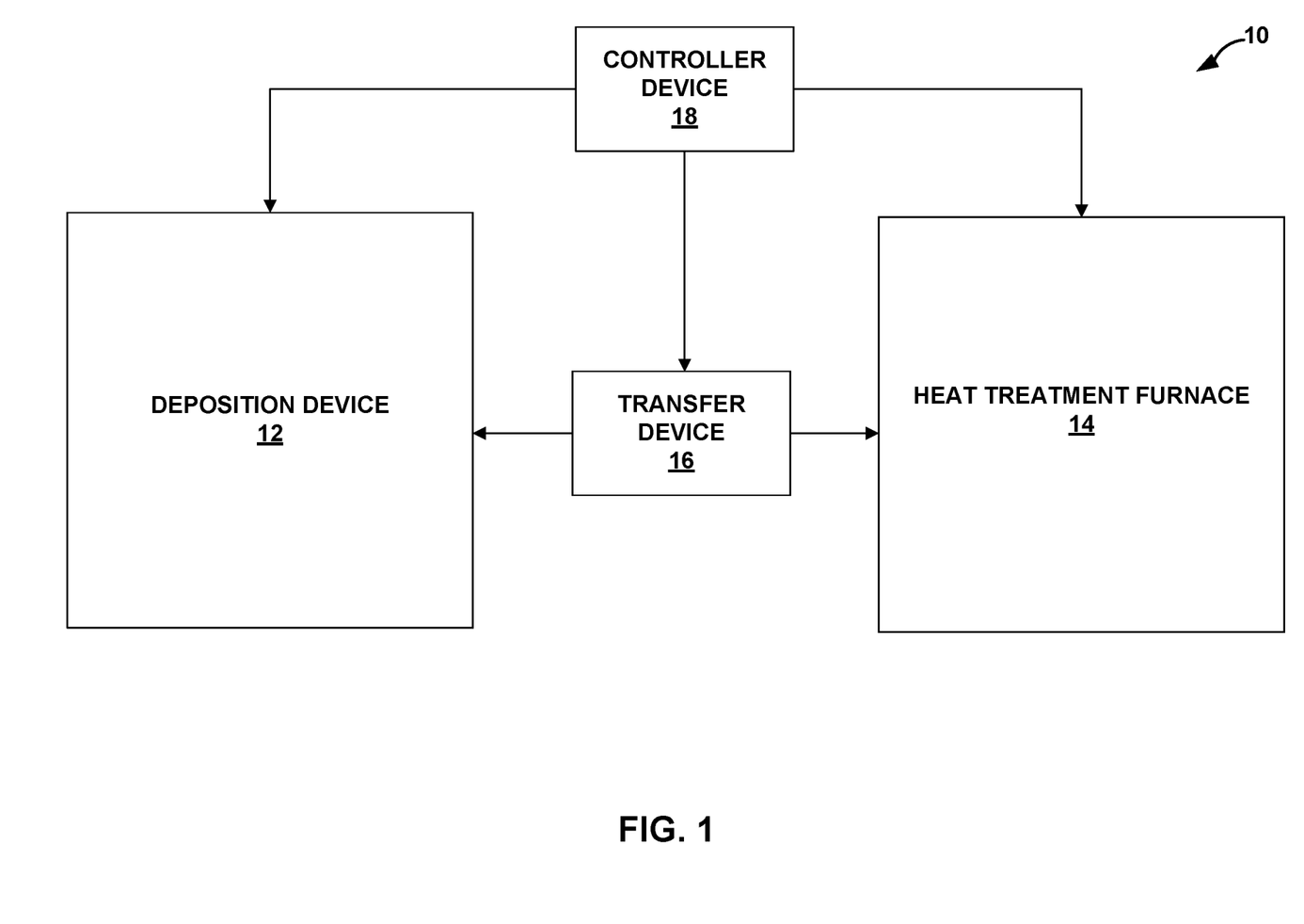
FIG. 1 is a conceptual and schematic diagram illustrating an example system for forming a coating on a substrate in accordance with an example of the disclosure.

FIG. 1 is a conceptual and schematic diagram illustrating an example system 10 for depositing an EBC on a substrate, heat treating the as-deposited EBC, subsequently depositing an abradable coating on the EBC, and, optionally, then heat treating the as-deposited abradable coating. The heat treatment of the as-deposited EBC may be configured to decrease the porosity of the as-deposited EBC, control the grain sizes of the heat treated EBC, and/or control the microstructure and distribution of the heat treated EBC (e.g., control the size and distribution of secondary phases such as ytterbium monosilicate in the coating). The optional heat treatment of the abradable coating may be configured to maintain or only slightly reduce the porosity of the abradable coating as compared to the porosity of the coating prior to heat treatment. As shown, system 10 includes deposition device 12, heat treatment furnace 14, and transfer device 16.

Figure 2:
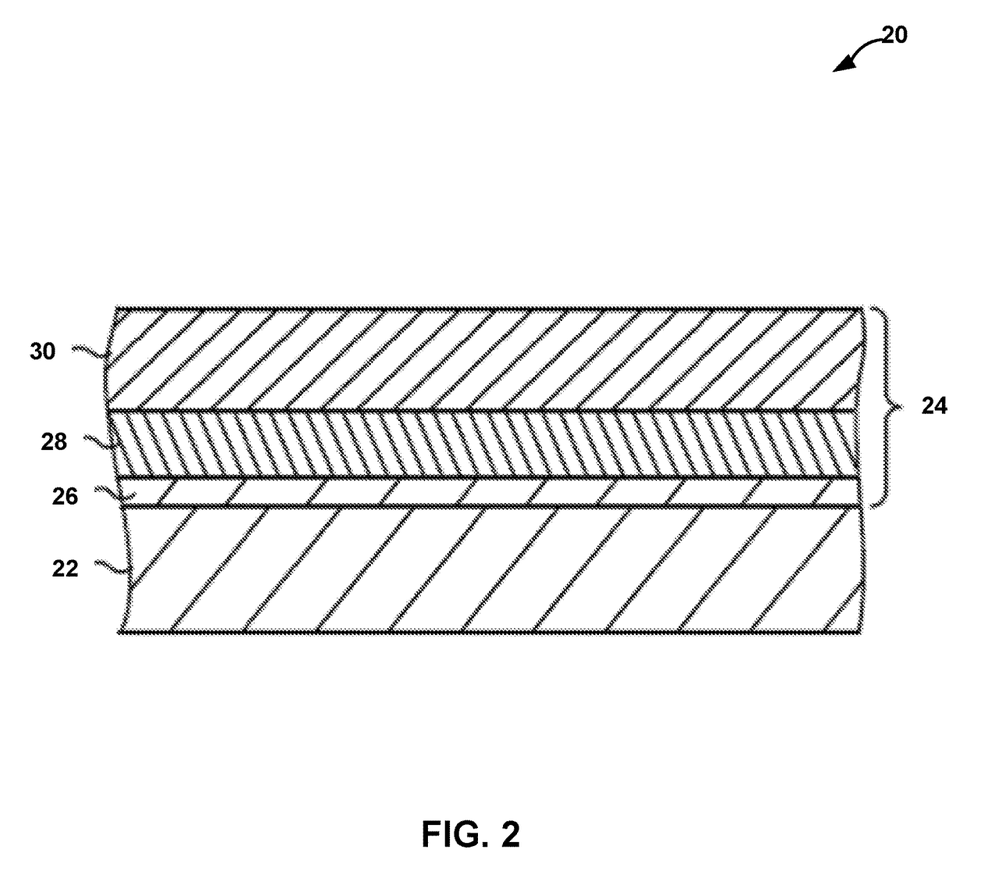
FIG. 2 is a conceptual block diagram illustrating an example article including an abradable layer, an EBC layer and an optional bond layer on a substrate.

Deposition device 12 may be configured to deposit one or more layers of an EBC and abradable coating system on a substrate to form a coated article, such as article 20 in FIG. 2, which include coating system 24 on substrate 22. In some examples, deposition device 12 may be configured to deposit coating 24 using a thermal spray process, a slurry deposition process, and/or other process suitable for depositing a coating, such as, EBC 28 and abradable coating 30. Example thermal spray processes may include suspension plasma spray, low pressure plasma spraying, plasma spray physical vapor deposition, and air plasma spraying. In one example, deposition device 12 may be configured to deposit the one or more layers of a coating system using a plasma spray process, such as an air plasma spray process. Coating 24 may be deposited via deposition device 12 in an atmosphere including, for example, air, an inert atmosphere, a vacuum, or the like. In some examples, the deposition of coating 24 by deposition device 12 may take place in a heated environment or may take place at room temperature. For ease of description, the operation of system 10 will primarily be described herein with regard to article 20 of FIG. 2 although other articles formed using system 10 are contemplated.

Furnace 14 may be configured to heat and maintain article 20 at a relatively high temperature following the deposition EBC 28 using deposition device 12, e.g., to perform a post-deposition heat treatment of EBC 28 on substrate 22 as well as a post-deposition heat treatment of abradable coating 30 on the heat treated EBC 28 and substrate 22. Furnace 14 may include an internal cavity sized and otherwise configured to contain article 20 after the deposition of EBC 28 on substrate 22 as well as article 20 after abradable coating 30 has been deposited on EBC 28 and substrate 22. Any suitable type of furnace 14 may be used that is capable of functioning as described in this disclosure. Furnace 14 may be an air furnace or a box furnace. In one example, a box furnace may be used with a controllable heat source. In some examples, furnace 14 may include one or more suitable heat sources such as moly-disilicide and/or silicon carbide heating elements, although other types of heat sources are contemplated. In one example, a conveyor-belt furnace may be employed. In one example, an induction system may be used to directly heat article 20 to deliver high heating rates. In some examples, article 20 may be heated for heat treatment using an oxy-fuel burner rather than a furnace.

Transfer device 16 may be configured to robotically transfer article 20 between furnace 14 and thermal spray device 12, as desired before and/or after the deposition of EBC 28 and abradable coating 30 via deposition device 12. For example, transfer device 16 may transfer substrate 22 to thermal spray device 12 for the deposition of EBC 28 (and option bond layer 26), then transfer the coated substrate 22 to furnace 14 for the heat treatment of EBC 28, then transfer the EBC 28 and substrate 22 back to thermal spray device 12 for the deposition of abradable coating 30 on the heat treated EBC 28, and then optionally transfer substrate 22 with EBC 28 and abradable coating 30 back to furnace 14 for the heat treatment of the as-deposited abradable coating 30. In other examples, article 20 may be manually transferred between deposition device 12 and furnace 14 as described.

Controller device 18 may be configured as a control device that controls deposition device 12, furnace 14, and/or transfer device 16 to operate in the manner described herein. For example, controller device 18 may be configured to control the temperature, including heating rate and temperature of furnace 14, e.g., during the post-deposition heat treatment of EBC 28 and the optional post deposition heat treatment of abradable coating 30. Controller device 18 may be configured to control transfer device 16 to control the transfer of article 20 between deposition device 12 and furnace 14. Controller device 18 may be communicatively coupled to at least one of deposition device 12, furnace 14, and/or transfer device 16 using respective communication connections. Such connections may be wireless and/or wired connections. While controller device 18 is shown as a single device, in other examples, controller device 18 may be more than one controller device, such as, e.g., where each of furnace 14, deposition device 12 and transfer device 16 are controlled by different controller devices.

Controller device 18 may include, for example, a desktop computer, a laptop computer, a workstation, a server, a mainframe, a cloud computing system, or the like. Controller device 18 may include or may be one or more processors or processing circuitry, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor" and "processing circuitry" as used herein may refer to any of the foregoing structure or any other structure suitable for implementation of the techniques described herein. In addition, in some examples, the functionality of controller device 18 may be provided within dedicated hardware and/or software modules.

In one example, system 10 may be configured to form an article such as article 20 shown in FIG. 2, which includes coating system 24 on substrate 22. For example, system 10 may be configured to deposit one or more layers of coating system 24 on substrate 24 using deposition device 12, e.g., by slurry deposition, air plasma spraying or other thermal spray deposition process. Following the deposition of EBC 28 and optional bond coat 26 on substrate 22 by deposition device 12, article 20 may be moved to furnace 14 (e.g., via transfer device 16) for a post deposition heat treatment of EBC 28. As will be described further below, the post-deposition heat treatment in furnace 14 may be controlled by controller device 18 so that EBC 28 is at an elevated temperature (e.g., a temperature at or above the crystallization temperature of EBC 28) for a desired duration of time. Controller device 18 may control the specific rate that the temperature is increased to reach the elevated heat treatment temperature. In some examples, the post-deposition heat treatment in furnace 14 may provide for a decrease in the open porosity and/or microcracks of EBC 28, e.g., based on the rate of temperature increase, and/or control of the grain sizes within heat treated EBC 28.

Likewise, following the deposition of abradable coating 30 on the heat treated EBC 28 by deposition device 12, article 20 may be moved to furnace 14 (e.g., via transfer device 16) for a post deposition heat treatment of abradable coating 30. As will be described further below, the post-deposition heat treatment in furnace 14 may be controlled by controller device 18 so that abradable coating 30 is at an elevated temperature (e.g., a temperature at or above the crystallization temperature of abradable coating 30) for a desired duration of time. Controller device 18 may control the specific rate that the temperature is increased to reach the elevated heat treatment temperature. In some examples, the post-deposition heat treatment in furnace 14 may maintain or not significantly reduce the porosity of the heat treated abradable coating compared to the as-deposited abradable coating of abradable coating 30, e.g., based on the rate of temperature increase and/or other parameters of the heat treatment. The heat treatment of the abradable coating may convert an amorphous phase of the EBC to crystalline phase while reducing the porosity of the as-deposited EBC.

FIG. 2 is a conceptual diagram illustrating an example article 20 including a substrate 22 and coating system 24. Coating system 24 includes an optional bond coat 26, an EBC 28, and a abradable layer 30. In some examples, article 20 may include a component of a gas turbine engine. For example, article 20 may include a part that forms a portion of a flow path structure, a seal segment, a blade track, an airfoil, a blade, a vane, a combustion chamber liner, or another portion of a gas turbine engine. Although not shown in FIG. 2, EBC 28 may include plurality of voids (e.g., pores, intercolumnar voids, cracks, and/or the like) within the layer. As described herein, heat treatment of coating 24 may decrease the porosity of the as-deposited EBC 28, e.g., by rapidly increasing the temperature of EBC 28 during post-deposition heat treatment to at least partially fill or close at least some of the voids during the heat treatment.

Substrate 22 may include a material suitable for use in a high-temperature environment. In some examples, substrate 22 may include a ceramic or a ceramic matrix composite (CMC). Suitable ceramic materials, may include, for example, a silicon-containing ceramic, such as silica ($SiO_2$) and/or silicon carbide (SiC); silicon nitride ($Si_3N_4$); alumina ($Al_2O_3$); an aluminosilicate; a transition metal carbide (e.g., WC, MozC, TiC); a silicide (e.g., $MoSi_2$, $NbSi_2$, $TiSi_2$); combinations thereof; or the like. In some examples in which substrate 22 includes a ceramic, the ceramic may be substantially homogeneous.

In examples in which substrate 22 includes a CMC, substrate 22 may include a matrix material and a reinforcement material. The matrix material may include, for example, silicon metal or a ceramic material, such as silicon carbide (SiC), silicon nitride ($Si_3N_4$), an aluminosilicate, silica ($SiO_2$), a transition metal carbide or silicide (e.g., WC, MozC, TiC, MoSiz, $NbSi_2$, $TiSi_2$), or another ceramic material. The CMC may further include a continuous or discontinuous reinforcement material. For example, the reinforcement material may include discontinuous whiskers, platelets, fibers, or particulates. Additionally, or alternatively, the reinforcement material may include a continuous monofilament or multifilament two-dimensional or three-dimensional weave, braid, fabric, or the like. In some examples, the reinforcement material may include carbon (C), silicon carbide (SIC), silicon nitride ($Si_3N_4$), an aluminosilicate, silica ($SiO_2$), a transition metal carbide or silicide (e.g. WC, MozC, TiC, $MoSi_2$, $NbSi_2$, $TiSi_2$), or the like.

Substrate 22 may be manufactured using one or more techniques including, for example, chemical vapor deposition (CVD), chemical vapor infiltration (CVI), polymer impregnation and pyrolysis (PIP), slurry infiltration, melt infiltration (MI), combinations thereof, or other techniques.

Coating 24 may help protect underlying substrate 22 from chemical species present in the environment in which article 20 is used, such as, e.g., water vapor, calcia-magnesia-alumina-silicate (CMAS; a contaminant that may be present in intake gases of gas turbine engines), or the like. Additionally, in some examples, coating 24 may also protect substrate 22 and provide for other functions besides that of an EBC, e.g., by functioning as a thermal barrier coating (TBC), abradable coating, erosion resistant coating, and/or the like.

As illustrated in FIG. 2, optional bond coat 26 of coating 24 is on substrate 22. As used herein, "formed on" and "on" mean a layer or coating that is formed on top of another layer or coating, and encompasses both a first layer or coating formed immediately adjacent a second layer or coating and a first layer or coating formed on top of a second layer or coating with one or more intermediate layers or coatings present between the first and second layers or coatings. In contrast, "formed directly on" and "directly on" denote a layer or coating that is formed immediately adjacent another layer or coating, e.g., there are no intermediate layers or coatings. In some examples, as shown in FIG. 2, bond coat 26 of coating system 24 may be directly on substrate 22. In other examples, one or more coatings or layers of coatings may be between bond coat 26 of coating 24 and substrate 22.

Bond coat 26 may be between EBC 28 and substrate 22 and may increase the adhesion of EBC 28 to substrate 22. In some examples, bond coat 26 may include silicon and take the form of a silicon bond layer. In some examples, bond coat 16 may include silicon, a metal silicide, RE monosilicate, RE disilicate, hafnium silicate, mullite, SiC, a metal oxide or a mixture thereof. Bond coat 16 may be in direct contact with substrate 22 and EBC 28. In some examples, bond coat 26 has a thickness of approximately 25 microns to approximately 250 microns, although other thicknesses are contemplated.

In examples in which substrate 22 includes a ceramic or CMC, bond coat 26 may include a ceramic or another material that is compatible with the material from which substrate 22 is formed. For example, bond coat 26 may include mullite (aluminum silicate, $Al_6Si_2O_{13}$), silicon metal or alloy, silica, a silicide, or the like. Bond coat 26 may further include other elements, such as a rare earth oxide or rare earth silicate including an oxide or silicate of lutetium (Lu), ytterbium (Yb), thulium (Tm), erbium (Er), holmium (Ho), dysprosium (Dy), gadolinium (Gd), terbium (Tb), europium (Eu), samarium (Sm), promethium (Pm), neodymium (Nd), praseodymium (Pr), cerium (Ce), lanthanum (La), yttrium (Y), and/or scandium (Sc).

The composition of bond coat 26 may be selected based on the chemical composition and/or phase constitution of substrate 22 and the overlying layer (e.g., EBC layer 28 of FIG. 2). For example, if substrate 22 includes a ceramic or a CMC, bond coat 26 may include silicon metal or alloy or a ceramic, such as, for example, mullite.

In some cases, bond coat 26 may include multiple layers. For example, in some examples in which substrate 22 includes a CMC including silicon carbide, bond coat 26 may include a layer of silicon on substrate 22 and a layer of mullite, a rare earth silicate, or a mullite/rare earth silicate dual layer on the layer of silicon. In some examples, a bond coat 26 including multiple layers may provide multiple functions of bond coat 26, such as, for example, adhesion of substrate 22 to an overlying layer (e.g., EBC layer 28 of FIG. 2), chemical compatibility of bond coat 26 with each of substrate 22 and the overlying layer, a better coefficient of thermal expansion match of adjacent layers, or the like.

Bond coat 26 may be applied on substrate 22 using, for example, thermal spraying, e.g., air plasma spraying, high velocity oxy-fuel (HVOF) spraying, low vapor plasma spraying, suspension plasma spraying; physical vapor deposition (PVD), e.g., electron beam physical vapor deposition (EB-PVD), directed vapor deposition (DVD), cathodic arc deposition; chemical vapor deposition (CVD); slurry process deposition; sol-gel process deposition; electrophoretic deposition; or the like.

Coating 14 includes EBC 28, which may be configured to help protect substrate 22 against deleterious environmental species, such as CMAS and/or water vapor. EBC 28 may include at least one of a rare-earth oxide, a rare-earth silicate, an aluminosilicate, or an alkaline earth aluminosilicate. For example, EBC 28 may include mullite, barium strontium aluminosilicate (BSAS), barium aluminosilicate (BAS), or strontium aluminosilicate (SAS). In some examples, EBC 28 may include at least one rare-earth oxide, at least one rare-earth monosilicate ($RE_2SiO_5$, where RE is a rare-earth element), at least one rare-earth disilicate ($RE_2Si_2O_7$, where RE is a rare-earth element), or combinations thereof. The rare-earth element in the at least one rare-earth oxide, the at least one rare-earth monosilicate, or the at least one rare-earth disilicate may include at least one of lutetium (Lu), ytterbium (Yb), thulium (Tm), erbium (Er), holmium (Ho), dysprosium (Dy), gadolinium (Gd), terbium (Tb), europium (Eu), samarium (Sm), promethium (Pm), neodymium (Nd), praseodymium (Pr), cerium (Ce), lanthanum (La), yttrium (Y), or scandium (Sc).

EBC 28 may be any suitable thickness. For example, EBC 28 may be about 0.005 inches (about 127 micrometers) to about 0.100 inches (about 2540 micrometers). In examples in which EBC 28 is a non-abradable EBC, EBC 28 may have a thickness of about 0.001 inches (about 25.4 micrometers) to about 0.005 inches (about 127 micrometers). In other examples, EBC 28 may have a different thickness.

Coating system 24 includes abradable coating 30 on EBC 28. In such a configuration, coating system 24 may be configured such that abradable coating 30 has a greater porosity than EBC 28, and the porosity of abradable coating 30 may be provided such that the outer surface of abradable coating 30 is abraded, e.g., when brought into contact with an opposing surface such as a blade tip. Abradable coating 30 may be on EBC 28, which may provide for better adhesion of abradable coating 30 to optional bond layer 26 or substrate 22. In some examples, abradable coating 30 may be about 0.005 inches (about 127 micrometers) to about 0.100 inches (about 2540 micrometers) thick. In other examples, abradable coating 30 may have a different thickness.

The composition of abradable coating 30 may be selected from similar compositions as those listed above for EBC 28. In some examples, the composition of abradable coating 30 may be the same or substantially similar to the composition of EBC 28. In other examples, the compositions may be different. Regardless of the composition or the thickness of EBC 28 or abradable coating 30 of FIG. 2, EBC 28 and abradable coating 30 may include a plurality of voids. For example, EBC 28 and abradable coating 30 may have a porous microstructure or a columnar microstructure. A porous microstructure may include a plurality of pores (e.g., voids) within the layer material, and a columnar microstructure may include columns of the layer material extending from the surface of a substrate (or another coating layer) with elongated intercolumnar voids. A porous or a columnar microstructure may improve the in-plane strain tolerance and/or the thermal cycle resistance of EBC 28 and abradable coating 30. In some examples, an average minimum dimension of the voids, such as, for example, an average minimum diameter of a pore of a porous microstructure, may be about 0.1 micrometers (μm) to about 20 μm.

In some example, the porosity of EBC 28 and the porosity of abradable coating 30 may be different, e.g., with abradable coating 30 having a higher porosity than EBC 28. In some examples, EBC 28 may include a porosity of less than about 10%, such as about 1% to about 5%, where porosity is measured as a percentage of pore volume divided by total volume of EBC 28. The porosity of EBC 28 may be the porosity following the EBC heat treatment described herein. Abradable coating 30 may include a porosity of more than about 5%, such as about 7% to about 20% where porosity is measured as a percentage of pore volume divided by total volume of layer 32. The porosity of abradable coating 30 may be the porosity following the abradable coating heat treatment described herein. In each case, the porosity of EBC 28 and abradable coating 30 may be measured using mercury porosimetry, optical microscopy or Archimedean method.

As described herein, in some examples, a post-deposition heat treatment may be used to decrease the porosity and/or microcracks of EBC 28 prior to deposition of abradable coating 30. For examples, the as-deposited EBC 28 may include open pores (e.g., interconnected pores in the layer) and/or microcrack networks. The open pores and/or microcracks may results in EBC 28 being permeable to gas, which may allow for undesirable oxidation and volatilization of article 20. The post deposition heat treatment of EBC 28, e.g., using a temperature increase of greater than 15° C./min, may decrease the open porosity and/or microcracks in EBC 28, e.g., as compared to the as-deposited EBC and/or a similar coating heat treated using a temperature increase of 15° C./min or less. The percentage of open porosity and/or microcracks in EBC 28 may be decreased to lower the gas permeability of EBC 28, e.g., which will enhance the EBCs performance as a barrier to protect substrate 22 from oxidation and volatilization.

The porosity and/or microcracks of EBC 28 as deposited may be decreased by heat treatment of EBC 28 following deposition. In some examples, the heat treatment of EBC 28 may decrease the porosity and/or microcracks of EBC 28 by at least about 25 percent (e.g., from about 6% to about 4.5%), at least about 33% (e.g., from about 6% to about 4%), or at least about 50 percent (e.g., from about 6% to about 3%), e.g., as compared to the porosity of the as-deposited EBC 28 and/or a similar coating that underwent heat treatment with a slower rate of temperature increase (e.g., 15° C./min or less).

As described herein, in some examples, a post-deposition heat treatment of abradable coating 30 may be performed on abradable coating 30. The heat treatment may maintain or only slightly reduce the porosity of abradable coating 30, e.g., while also transforming amorphous phase of the as-deposited abradable coating 30 to crystalline phase. In some examples, the porosity of abradable coating 30 may be substantially the same before and after the heat treatment, or may be reduced by less than about 10% compared to the porosity of abradable coating 30 before the heat treatment, such as less than about 5% or less than about 3% or less than about 1%.

In some examples, the porosity of the as-deposited EBC 28 and abradable coating 30 may be created and/or controlled by plasma spraying the coating material using a co-spray process technique in which the coating material and a coating material additive are fed into a plasma stream with two radial powder feed injection ports. The feed pressures and flow rates of the coating material and coating material additive may be adjusted to inject the material on the outer edge of the plasma plume using direct 90-degree angle injection. This may permit the coating material particles to soften but not completely melt, and the coating material additive to not burn off, but rather soften sufficiently for adherence within coating 24.

In other examples, the porosity of EBC 28 and abradable coating 30 may be controlled by the use of coating material additives and/or processing techniques to create the desired porosity. For example, to form an abradable layer such as abradable coating 30 of coating 24 in FIG. 2, a fugitive material that melts or burns at the use temperatures of the component (e.g., a blade track) may be incorporated into the coating material that forms abradable coating 30. The fugitive material may include, for example, graphite, hexagonal boron nitride, or a polymer such as a polyester, and may be incorporated into the coating material prior to deposition of the coating material on substrate 22 to form abradable coating 30. The fugitive material then may be melted or burned off in a post-formation heat treatment, or during operation of the gas turbine engine, to form pores in coating 24. The post-deposition heat-treatment may be performed at up to about 1500° C. for a component having a substrate 22 that includes a CMC or other ceramic.

In other examples, the porosity of coating system may be created or controlled in a different manner, and/or coating system 24 may be deposited on substrate 22 using a different technique. For example, coating system 24 may be deposited using a wide variety of coating techniques, including, for example, a thermal spraying technique such as plasma spraying or suspension plasma spraying, physical vapor deposition (PVD) such as EB-PVD (electron beam physical vapor deposition) or DVD (directed vapor deposition), cathodic arc deposition, slurry process deposition, sol-gel process deposition, or combinations thereof.

In some examples in which EBC 28 or abradable coating 30 has a columnar microstructure, EBC 28 and/or abradable coating 30 may be deposited on substrate 32 using a suspension plasma spray technique, an EB-PVD technique, a plasma spray physical vapor deposition (PSPVD) technique, or a directed vapor deposition (DVD) technique. In some examples, EBC 28 and/or abradable coating 30 including a columnar microstructure may include a dense vertically cracked (DVC) coating, which in some cases, may be deposited on substrate 22 using an air plasma spray technique.

Figure 3:
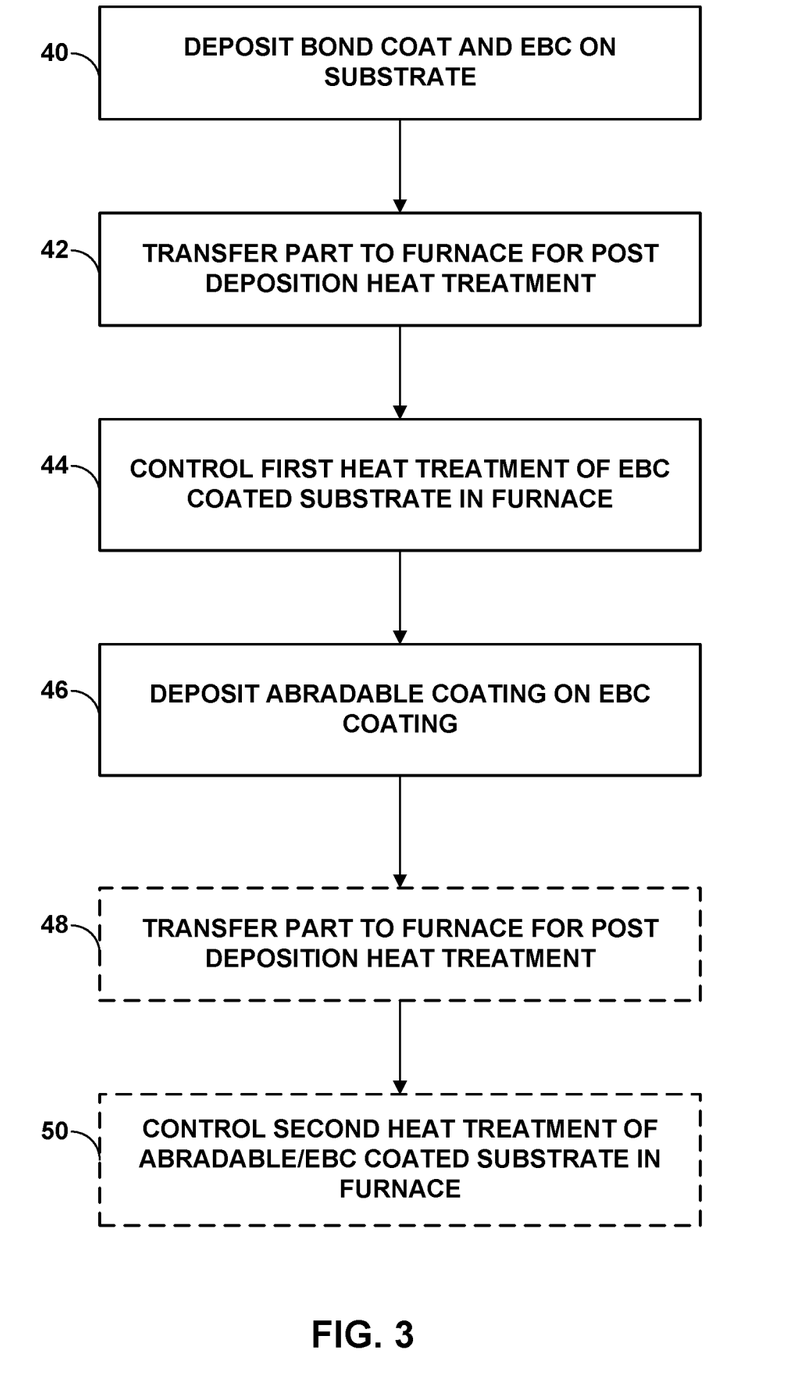
FIG. 3 is a flow diagram illustrating an example technique for forming an article in accordance with an example of the disclosure.

FIG. 3 is a flow diagram illustrating an example technique for forming a coating system on a substrate such as coating system 24 of article 20 on substrate 22. The technique of FIG. 3 will be described with respect to system 10 of FIG. 1 and article 20 of FIG. 2 for ease of description only. A person having ordinary skill in the art will recognize and appreciate that the technique of FIG. 3 may be implemented using systems other than system 10 of FIG. 1, may be used to form articles other than article 20 of FIG. 2, or both.

As shown in FIG. 3, substrate 22 may be positioned within deposition device 12 and controller device 18 may control deposition device 12 to deposit optional bond layer 26 and EBC 28 on substrate 22 (40). For example, deposition device 12 may deposit each of bond layer 26 and EBC 28 by thermal spraying (e.g., air plasma spraying) or slurry deposition under the control of controller device 18 (40). In some examples, a tape casting process may be used to deposit bond layer 26 and EBC 28. The temperature within deposition device 12 may be approximately room temperature or elevated above room temperature.

As deposited, EBC 28 and/or bond layer 26 may have a relatively high amorphous phase concentration, e.g., due to the high cooling rates/quenching of the particles upon impact with substrate 22. For example, EBC 28 may have an amorphous phase of at least about 70 weight percent (wt %), such as, at least about 85 wt %. Conversely, EBC 28 may have a crystalline phase of less than about 30 wt %, such as less than about 15 wt %. As noted above, without a post-deposition heat treatment, the amorphous phase may change to a crystalline structure over time when subjected to higher temperatures, e.g., during operation of a jet engine. An uncontrolled transition from amorphous to crystalline structure with time may also result in volumetric changes and, thus, internal stresses in the layer(s).

Following deposition of EBC 28 and optional bond layer 26 on substrate 22, the article may be transferred to furnace 14 by transfer device 16 for a first post-deposition heat treatment (42). Once within furnace 14, controller device 18 may control the temperature of furnace to heat treat the as-deposited EBC 28 by heating EBC 28 to or above a selected temperature for a selected period of time (44). In some examples, the first post-deposition heat treatment may take place before or after EBC 28 cools to room temperature following its deposition. The post-deposition heat treatment temperature and duration within furnace 14 may be controlled by controller device 18 and may be selected to increase the crystalline phase concentration of EBC 28 on substrate 22. For example, furnace 14 may be at a treatment temperature of at or above the crystalline temperature of the layer(s) of EBC 28.

In accordance with some examples of the disclosure, the post-deposition heat treatment of EBC 28 may be configured to decrease the porosity and/or microcrack networks of EBC 28. In some examples, the heat treatment may include increasing the temperature of EBC 28 at a relatively fast rate (e.g., a rate greater than 15° C./min, such as, about 100° C./min to about 300° C./min). In some examples, EBC 28 may be at approximately room temperature (e.g., about 23° C.) at the beginning of the first heat treatment. The temperature of EBC 28 may be increased (e.g., by heating in furnace 14) at the relatively high rate to the desired elevated heat treatment temperature. In some examples, the high heating rate may be accomplished by pre-heating furnace 14 prior to transfer of EBC 28, bond layer 26, and substrate 22 to furnace 14. In some examples, the heat treatment temperature may be at or above about 500° ° C. to about 1500° C. EBC 28 may be held at or above the heat treatment temperature for a desired period of time (e.g., about 0.1 hours to about 100 hours). Controller device 18 may control furnace 14 to hold a substantially constant heat treatment temperature within furnace or a heat treatment temperature that varies within a prescribed range over a selected period of time.

In some examples, the combination of EBC 28, bond layer 26, and substrate 22 may be held within furnace 14 at the heat treatment temperature such that EBC 28 reaches a temperature at or above the crystalline phase temperature of EBC 28. The combination of EBC 28, bond layer 26, and substrate 22 may be held within furnace 14 at the heat treatment temperature such that EBC 28 reaches a temperature at or above the temperature at which the amorphous phase transitions to a crystalline phase. The combination of EBC 28, bond layer 26, and substrate 22 may be held within furnace 14 for heat treatment for a suitable amount of time to provide for a desired amount of crystalline phase in EBC 28.

In some examples, the relatively high rate of temperature change to the elevated heat treatment temperature may allow the amorphous phase of the as-deposited coating to flow, e.g., to fill the pores (e.g., interconnected pores), microcracks, and/or other voids of the as-deposited coating, before transitioning to crystalline phase. The filling of the pores, microcracks, and/or other voids may reduce the gas permeability of the one or more layers EBC 28 and/or bond layer 26. In some examples, the porosity and/or microcracks of EBC 28 and/or bond layer 26 may be decreased by the first heat treatment (44). In some examples, the heat treatment of EBC 28 may decrease the porosity and/or microcracks of EBC 28 by at least about 25 percent (e.g., about 6% to about 4.5%), at least about 33% (e.g., from about 6% to about 4%), or at least about 50 percent (e.g., from about 6% to about 3%), e.g., as compared to the porosity of the as-deposited EBC 28 and/or a similar coating that has been heat treated with a slower rate of temperature increase (e.g., 15° C./min or less). In some examples, EBC 28 and/or bond layer 26 may be substantially hermetic following the post deposition heat treatment.

In some examples, as will be described further below, in the case of an abradable layer, the heat treatment of abradable coating 30 following the heat treatment of EBC 28 without abradable coating 30 may maintain or only decrease the porosity and/or microcracks of abradable layer 30 by about 10 percent or less, such as about 0.5% to about 5% or about 2% to about 5%, compared to the porosity of the as-deposited abradable coating 30.

Additionally, or alternatively, the first heat treatment of EBC 28 may be configured to control the grain size and/or amount of crystalline phase in the heat treated EBC 28. In some examples, the rate of temperature change, elevated heat treatment temperature, and/or duration of the heat treatment may be selected to nucleate and grow a relatively small number of grains in the heat treated EBC 28. The relatively small number of grains may be grown to a relatively large size, thus reducing the concentration of grain boundaries in EBC 28. Additionally, or alternatively, the heat treatment of EBC 28 may be configured to control the microstructure of EBC 28 (e.g., control the size and distribution of secondary phases such as ytterbium monosilicate in the coating).

In some examples, the number of nucleated grains may be dependent upon the heat treatment temperature. The heat treatment duration may also affect the final number of grains remaining. If the heat treatment is high enough in temperature to grow the grains, smaller grains will be consumed at the expense of the larger ones. The heat treatment temperature or temperature ranges may be selected achieve specific nucleation and/or growth characteristics. In some examples, a grain growth portion of the heat treatment may need to be performed at a high enough temperature that allows for sufficient solid state diffusion rates. In some examples, such a heat treatment temperature may have a lower limit of about 800 degrees Celsius.

Following the post-deposition heat treatment of EBC 28, the combination of EBC 28, bond layer 26, and substrate 22 may be cooled within furnace 14 or outside furnace from that of the heat treatment temperature. In some examples, controller device 18 may control the rate of cooling of furnace 14 over a particle period of time such that EBC 28 cools at a controlled rate over the period of time, as compared to simply removing the combination of EBC 28, bond layer 26, and substrate 22 from furnace 14 and or simply turning off furnace 14 while article 20 is inside. In other example, controller device 18 may simply turn off the heating of furnace 14 or the combination of EBC 28, bond layer 26, and substrate 22 may be removed from furnace 14 into a cooler environment.

Following the first heat treatment step (44), the combination of EBC 28, bond layer 26, and substrate 22 may be transferred to deposition device 12 and controller device 18 may control deposition device 12 to deposit abradable coating 30 on EBC 28 (46). For example, deposition device 12 may deposit abradable coating 30 by thermal spraying (e.g., air plasma spraying) or slurry deposition under the control of controller device 18 (46). In some examples, a tape casting process may be used to deposit abradable coating 30. The same deposition device that was used to for the deposition of EBC 28 and bond layer 26 may be used to deposit abradable coating 30, or a different deposition device may be used. The same deposition process that was used to for the deposition of EBC 28 and bond layer 26 may be used to deposit abradable coating 30, or a different deposition process may be used.

In some examples, the as-deposited abradable coating 30 may have a relatively high porosity (e.g., greater than about 5%, such as, about 7% to about 40%). The porosity of the as-deposited coating 30 may be achieved by removing as fugitive material from the abradable coating as described above. The as-deposited abradable coating 30 may have a greater porosity than the heat treated EBC 28.

Following the deposition of abradable coating 30 on EBC 28 (46), article 20 may or may not undergo a second heat treatment step to heat treat abradable coating 30. In some examples, following the deposition of abradable coating 30 on EBC 28, article 20 may be transferred to furnace 14 by transfer device 16 (48) for an optional second post-deposition heat treatment (50). Once within furnace 14, controller device 18 may control the temperature of furnace to heat treat the as-deposited abradable coating 30 by heating abradable coating 30 to or above a selected temperature for a selected period of time (50). In some examples, the second post-deposition heat treatment may take place before or after abradable coating 30 cools to room temperature following its deposition. The second post-deposition heat treatment temperature and duration within furnace 14 may be controlled by controller device 18 and may be selected to increase the crystalline phase concentration of abradable coating 30. For example, furnace 14 may be at a treatment temperature of at or above the crystalline temperature of the layer(s) of abradable coating 30.

In accordance with some examples of the disclosure, the second post-deposition heat treatment of abradable coating 30 may be configured to maintain the porosity and/or microcrack networks of abradable coating 30. In some examples, the second heat treatment may include increasing the temperature of abradable coating 30 at a relatively slow rate (e.g., a rate less than 15° C./min, such as, less than or equal to about 10° C./min). In some examples, abradable coating 30 may be at approximately room temperature (e.g., about 23° C.) at the beginning of the second heat treatment. The temperature of abradable coating 30 may be increased (e.g., by heating in furnace 14) at the relatively slow rate to the desired elevated heat treatment temperature. In some examples, the slow heating rate may be accomplished by not pre-heating furnace 14 prior to transfer of article 20 to furnace 14. In some examples, the second heat treatment temperature may be at or above about 500° C. to about 1500° ° C. Abradable coating 30 may be held at or above the heat treatment temperature for a desired period of time (e.g., about 0.1 hours to about 100 hours). Controller device 18 may control furnace 14 to hold a substantially constant heat treatment temperature within furnace or a heat treatment temperature that varies within a prescribed range over a selected period of time. In some examples, the heating rate, cooling rate, duration, and/or heat treatment temperature of the second heat treatment (50) may be different than the first heat treatment (44).

In some examples, the heat treatment of abradable coating 30 may be tailored to maintain or only nominally reduce the porosity of the abradable coating 30 prior to the heat treatment. As described above, it has been found that is some cases, increasing a temperature at a relatively low rate (e.g., less than 15° C./min, such as about 10° C./min) for a heat treatment of a coating may cause the amorphous phase to transition to crystalline phase with substantially no flow such that the microstructure of the coating is effectively "locked in" without the amorphous material flowing into the pores and microcrack of the as-deposited material. In such an example, the porosity (e.g., open porosity and/or microcracks) of the as-deposited coating may not substantially decrease as a result of the heat treatment. In some examples, the porosity of abradable coating 30 may be substantially the same as the porosity of abradable coating 30 prior to the heat treatment, or to be reduced by less than approximately 10 percent, such as about 0.5 percent to about 5 percent. In some examples, the porosity of abradable coating 30 following the second heat treatment (50) may be greater than about 5% such as, about 7% to about 40%. The porosity of abradable coating 30 following the heat treatment may be greater than the porosity of the heat treated EBC 28.

The technique of FIG. 3 is one example of a process for forming an article having both an EBC and abradable coating, wherein the EBC is heat treated prior to the deposition of the abradable coating. In some examples, the abradable coating is heat treated following the deposition rather than only heat treating the EBC with the abradable coating. In some examples, after thermal spraying of the EBC (or otherwise deposited) and before deposition of the abradable coating, the EBC may be heat treated under a particular set of conditions that promote a dense EBC, for example a high heating/cooling rate of about 100° C./min. After the EBC is heat treated and abradable coating is thermally sprayed (or otherwise deposited) on top of the EBC, a second heat treatment is performed with a second set of conditions that maintain the porous structure of the abradable coating, for example a slow heating/cooling rate of 10° C./min.

Figure 4:
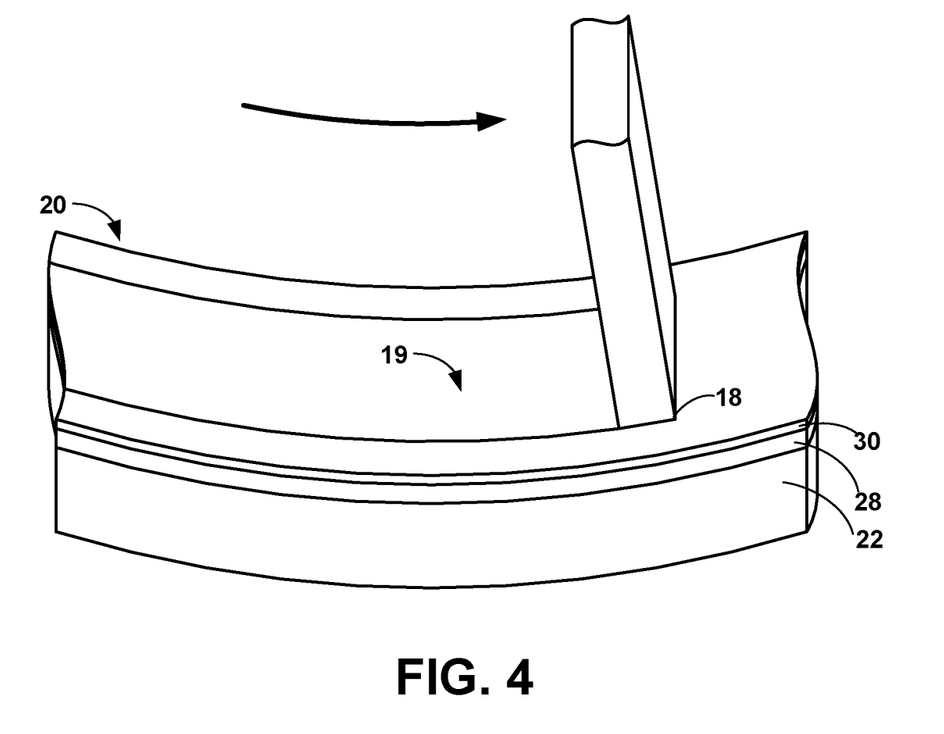
FIG. 4 is a perspective diagram illustrating an example article that includes an abradable coating and an EBC coating deposited on a substrate.

FIG. 4 illustrates a perspective diagram of an example article 20 that may be used in a high-temperature mechanical system. As described above, article 20 includes a substrate 22, EBC 28 deposited on substrate 22, and an abradable coating 30 deposited on EBC 28 and substrate 12. Optional bond layer 26 is not shown in FIG. 4.

Article 20 may be a component of a high-temperature mechanical system, such as, for example, a gas turbine engine or the like. In some examples, article 20 may include a gas turbine blade track or gas turbine blade shroud. However, while the description herein may be directed to a gas turbine blade track or shroud, it will be understood that the disclosure is not limited to such examples. Rather, abradable coating 30 and EBC 28 may be deposited over any article which requires or may benefit from an abradable coating and EBC. For example, abradable coating 30 and EBC 28 may be deposited on a cylinder of an internal combustion engine, an industrial pump, a housing or internal seal ring of an air compressor, or an electric power turbine.

While operating article 20 in high-temperature environments, a rotating component (e.g., blade tip 18) may abrade abradable coating 14 to cut track 19 in abradable coating 30. The thickness of abradable coating 30 may be selected such that track 19 does not penetrate all the way through abradable coating 30 into EBC 28. In the case of a turbine, as the turbine blade rotates, tip 18 of the turbine blade contacts abradable coating 30 and wears away a portion of coating 30 to form track 19 in the abradable coating corresponding to the path of the turbine blade. The intimate fit between the blade tip and abradable coating provides a seal that can reduce the clearance gap between the rotating component and an inner wall of the track or shroud, which can reduce leakage around a tip of the rotating part to enhance the power and efficiency of the gas turbine engine.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in a computer system-readable medium, such as a computer system-readable storage medium, containing instructions. Instructions embedded or encoded in a computer system-readable medium, including a computer system-readable storage medium, may cause one or more programmable processors, or other processors, to implement one or more of the techniques described herein, such as when instructions included or encoded in the computer system-readable medium are executed by the one or more processors. Computer system readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer system readable media. In some examples, an article of manufacture may comprise one or more computer system-readable storage media.

Various examples have been described. These and other examples are within the scope of the following claims and clauses.

Clause 1. A method comprising: depositing an environmental barrier coating (EBC) on a ceramic or ceramic matrix composite (CMC) substrate to form an as-deposited EBC; heat treating the as-deposited EBC following the deposition of the as-deposited EBC on the substrate to form a heat treated EBC; and subsequently depositing an abradable coating on the heat treated EBC to form an as-deposited abradable coating.

Clause 2. The method of clause 1, wherein heat treating the as-deposited EBC comprises heat treating of the as-deposited EBC to decrease a porosity of the heat treated EBC as compared to the as-deposited EBC.

Clause 3. The method of clause 1 or 2, wherein heat treating the as-deposited EBC comprises heating the as-deposited EBC at a first controlled rate, wherein the controlled rate is selected to decrease at least one of an open porosity or microcracks of the heat-treated EBC compared to the as-deposited EBC.

Clause 4. The method of clause 3, wherein decreasing the at least one of the open porosity or the microcracks of the heat-treated coating compared to the as-deposited coating comprises decreasing a percentage of interconnected pores and crack networks of the heat-treated coating compared to the as-deposited coating.

Clause 5. The method of clause 3, wherein decreasing the at least one of the open porosity or the microcracks of the heat-treated coating compared to the as-deposited coating comprises closing at least a portion of the interconnected pores and microcrack networks of the as-deposited coating.

Clause 6. The method of any one of clauses 1-5, further comprising heat treating the as-deposited abradable coating following deposition of the abradable coating on the EBC to form a heat treated abradable coating.

Clause 7. The method of clause 6, wherein heat treating the as-deposited EBC includes heating the as-deposited EBC at a first controlled rate, wherein heat treating the as-deposited abradable coating includes heating the as-deposited abradable coating at a second controlled rate that is less than the first controlled rate.

Clause 8. The method of clause 7, wherein the first controlled rate is greater than about 100 degrees Celsius per minute.

Clause 9. The method of clause 7, wherein the second controlled rate is less than 15 degrees Celsius per minute.

Clause 10. The method of any one of clauses 6-9, wherein heat treating the as-deposited EBC includes heating the as-deposited EBC to or above a first temperature, and heat treating the as-deposited abradable coating includes heating the as-deposited EBC to or above a second temperature, wherein the first temperature and the second temperature are approximately equal.

Clause 11. The method of any one of clauses 1-10, wherein the heat treated EBC has a porosity of less than about 5%.

Clause 12. The method of any one of clauses 1-11, wherein the as-deposited abradable coating has a porosity of greater than 10%.

Clause 13. The method of any one of clauses 6-12, wherein the heat treated abradable coating has a porosity of greater than 5%.

Clause 14. The method of any one of clauses 1-13, wherein the as-deposited abradable coating includes a fugitive material, the method further comprising removing the fugitive material of the as-deposited abradable coating to create open pores in the abradable coating.

Clause 15. The method of any one of clauses 1-14, wherein the EBC and abradable coating each includes at least one of rare earth (RE) monosilicate or RE disilicate.

Clause 16. The method of any one of clauses 1-15, wherein depositing the EBC on the substrate to form the as-deposited EBC comprises depositing the EBC on the substrate via at least one of thermal spray deposition or slurry deposition.

Clause 17. The method of any one of clauses 1-16, wherein the heat treated EBC is a substantially hermetic EBC.

Clause 18. A system comprising: a deposition device; a furnace; and a controller device configured to control the deposition device to deposit an environmental barrier coating (EBC) on a ceramic or ceramic matrix composite (CMC) substrate to form an as-deposited EBC, control the furnace to heat treat the as-deposited EBC following the deposition of the as-deposited EBC on the substrate to form a heat treated EBC, and control the deposition device to subsequently deposit an abradable coating on the heat treated EBC to form an as-deposited abradable coating.

Clause 19. The system of clause 18, wherein the heat treatment of the as-deposited EBC is configured to decrease a porosity of the heat treated EBC as compared to the as-deposited EBC.

Clause 20. The system of clause 18, wherein the controller device configured to control the furnace to heat treat the as-deposited abradable coating following deposition of the abradable coating on the EBC to form a heat treated abradable coating.

Clause 21. A system configured to perform a method according to any one clauses 1-17.

Clause 22. An article comprising a heat treated EBC on a ceramic or ceramic matrix composite (CMC); and an abradable coating on the heat treated EBC.

Clause 23. The article of clause 22, wherein the abradable coating comprises a heat treated abradable coating.

Clause 24. The article of clause 22, wherein the abradable coating comprises an as-deposited abradable coating.

Clause 25. An article formed by a method according to any one clauses 1-17.

The invention claimed is:
1. A method comprising:
depositing an environmental barrier coating (EBC) on a ceramic or ceramic matrix composite (CMC) substrate to form an as-deposited EBC;
heat treating the as-deposited EBC following the deposition of the as-deposited EBC on the substrate to form a heat treated EBC having a first porosity;
subsequently depositing an abradable coating on the heat treated EBC to form an as-deposited abradable coating; and
subsequently heat treating the as-deposited abradable coating to form a heat treated abradable coating having a second porosity that is greater than the first porosity of the heat treated EBC,
wherein heat treating the as-deposited EBC includes heating the as-deposited EBC at a first controlled rate,
wherein heat treating the as-deposited abradable coating includes heating the as-deposited abradable coating at a second controlled rate that is less than the first controlled rate, and wherein heating the as-deposited abradable coating at the second controlled rate maintains a porosity of the heat treated abradable coating as compared to the as-deposited abradable coating.

2. The method of claim 1, wherein heat treating the as-deposited EBC comprises heat treating of the as-deposited EBC to decrease a porosity of the heat treated EBC as compared to the as-deposited EBC.

3. The method of claim 1, wherein the first controlled rate is selected to decrease at least one of an open porosity or microcracks of the heat-treated EBC compared to the as-deposited EBC.

4. The method of claim 3, wherein decreasing the at least one of the open porosity or the microcracks of the heat-treated coating compared to the as-deposited coating comprises decreasing a percentage of interconnected pores and crack networks of the heat-treated coating compared to the as-deposited coating.

5. The method of claim 3, wherein decreasing the at least one of the open porosity or the microcracks of the heat-treated coating compared to the as-deposited coating comprises closing at least a portion of interconnected pores and microcrack networks of the as-deposited coating.

6. The method of claim 1, wherein the first controlled rate is greater than about 100 degrees Celsius per minute.

7. The method of claim 1, wherein the second controlled rate is less than 15 degrees Celsius per minute.

8. The method of claim 1, wherein heat treating the as-deposited EBC includes heating the as-deposited EBC to or above a first temperature, and heat treating the as-deposited abradable coating includes heating the as-deposited EBC to or above a second temperature, wherein the first temperature and the second temperature are approximately equal.

9. The method of claim 1, wherein the heat treated EBC has a porosity of less than about 5%.

10. The method of claim 1, wherein the as-deposited abradable coating has a porosity of greater than 10%.

11. The method of claim 1, wherein the heat treated abradable coating has a porosity of greater than 5%.

12. The method of claim 1, wherein the as-deposited abradable coating includes a fugitive material, the method further comprising removing the fugitive material of the as-deposited abradable coating to create open pores in the abradable coating.

13. The method of claim 1, wherein the EBC and abradable coating each includes at least one of rare earth (RE) monosilicate or RE disilicate.

14. The method of claim 1, wherein depositing the EBC on the substrate to form the as-deposited EBC comprises depositing the EBC on the substrate via at least one of thermal spray deposition or slurry deposition.

15. The method of claim 1, wherein the heat treated EBC is a substantially hermetic EBC.

16. The method of claim 1, wherein the heat treatment of the as-deposited EBC including heating at the first controlled rate increases a density of the heat treated EBC as compared to the as-deposited EBC.

17. The method of claim 1, wherein the heat treatment of the as-deposited EBC including heating at the first controlled rate is such that an amorphous phase of the as-deposited EBC flows to fill pores and/or microcracks of the as-deposited EBC before transitioning to crystalline phase during the heat treatment.

18. The method of claim 17, wherein the heat treatment of the as-deposited abradable coating including heating at the second controlled rate is such that an amorphous phase of the as-deposited abradable coating transitions to crystalline phase without flow of the amorphous phase to fill pores and/or microcracks of the as-deposited abradable coating during the heat treatment.

19. The method of claim 1, wherein the first controlled rate is greater than about 100 degrees Celsius per minute, and wherein the second controlled rate is less than 15 degrees Celsius per minute.

* * * * *